United States Patent
Furuyama

[11] Patent Number: 6,097,895
[45] Date of Patent: Aug. 1, 2000

[54] IMAGE BLUR CORRECTION APPARATUS

[75] Inventor: Kiyomitsu Furuyama, Yokohama, Japan

[73] Assignee: Canon Kabushiki Kaisha, Tokyo, Japan

[21] Appl. No.: 09/102,815

[22] Filed: Jun. 23, 1998

[30] Foreign Application Priority Data

Jun. 27, 1997 [JP] Japan .................................... 9-186011

[51] Int. Cl.$^7$ ................................................. G03B 17/00
[52] U.S. Cl. ............................... 396/55; 396/52; 396/299
[58] Field of Search ................................. 396/52, 53, 54, 396/55, 299, 297

[56] References Cited

U.S. PATENT DOCUMENTS 5,128,704  7/1992  Hayashi et al. .......................... 396/299
5,940,631  8/1999  Hirano et al. .............................. 396/55

*Primary Examiner*—Russell Adams
*Attorney, Agent, or Firm*—Fitzpatrick, Cella, Harper & Scinto

[57] ABSTRACT

The present invention provides an image blur correction apparatus wherein an image blur correction system is capable of being selectively set, at least, so as to operate in a first image blur correction characteristic or operate in a second image blur correction characteristic different from the first image blur correction characteristic, changeover between them is such that circular changeover is effected between the image blur correction characteristics every execution of a common predetermined operation on a predetermined control member (for example, every depression on a control member of a depression type), and the image blur correction system is forcibly reset so as to operate in the first image blur correction characteristic at start of power supply to the image blur correction apparatus, irrespective of which is the latest image blur correction characteristic set in response to the operation on the control member, whereby the image blur correction system is always set in the determined characteristic every on of power, thus providing the apparatus with good operability.

19 Claims, 10 Drawing Sheets

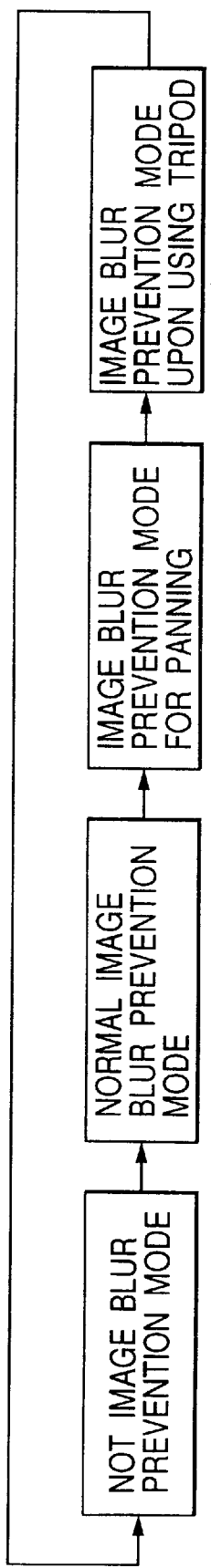
FIG. 2
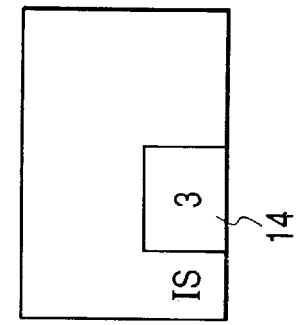
FIG. 3A
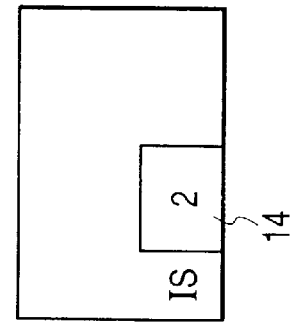
FIG. 3B
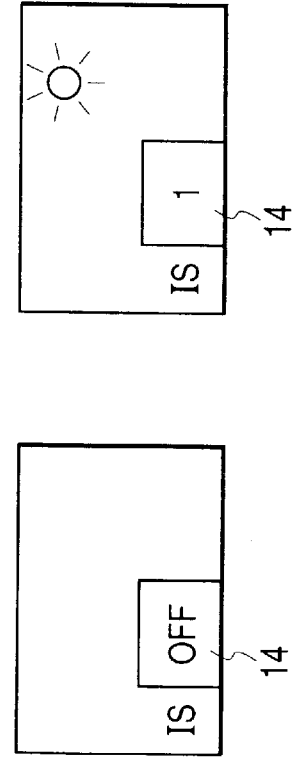
FIG. 3C
FIG. 3D

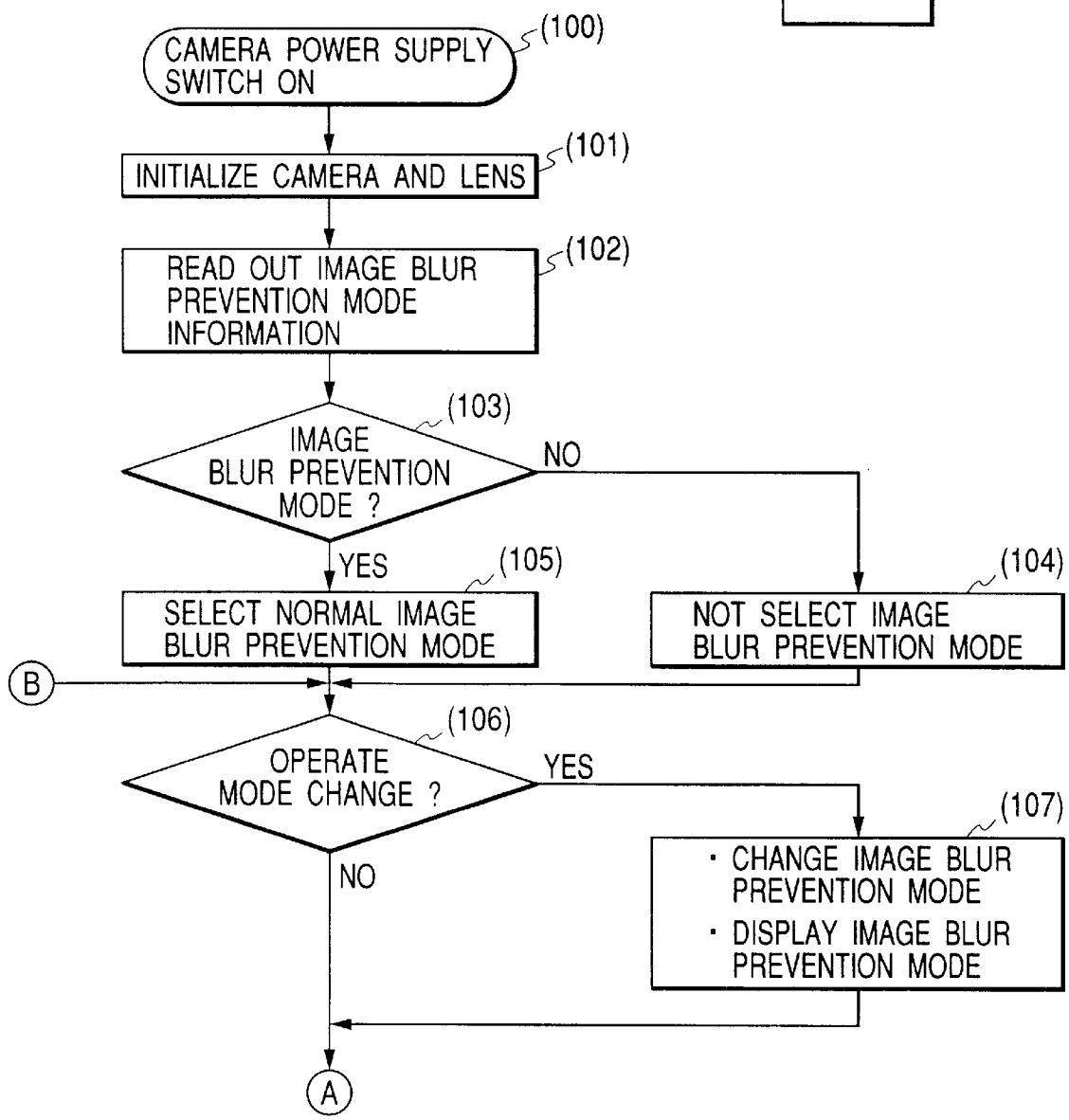

| FIG. 5A |
| FIG. 5B |

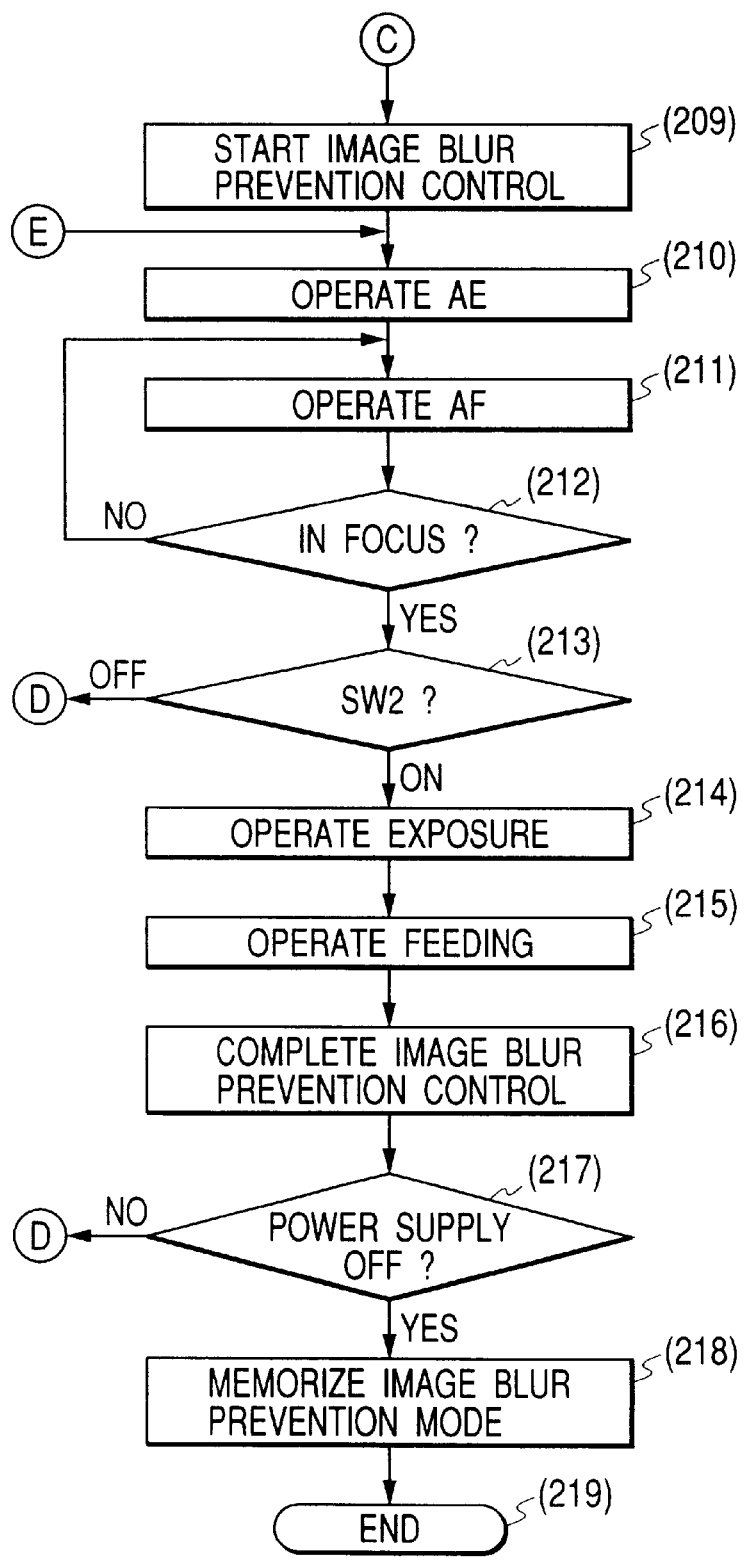

IMAGE BLUR CORRECTION APPARATUS

BACKGROUND OF THE INVENTION

1. Field of the Invention

The present invention relates to an image blur correction apparatus for preventing an image blur caused by a hand shake or the like in cameras, optical equipment, and so on.

2. Related Background Art

There are a variety of conventional devices for image blur correction of camera and some types of conventional blur correction methods. Among the image blur correction methods used in cameras etc., a typical example is a method for driving a part or the whole of a photographing optical system, based on information about the shake of camera detected by a fluctuation detecting sensor, so as to prevent the image blur on the image plane.

The image blur correction apparatus of this type is normally arranged to suitably prevent vibration due to the hand shake or vibration having a frequency distribution similar thereto; specifically, the fluctuation detecting sensor and a driving mechanism for a blur correction optical system are selected so as to be compatible with the vibration and a response frequency band of the fluctuation detecting sensor and driving mechanism is set according thereto.

The image blur correction apparatus of this type thus has the following problems when panning, which is an operation of camera, is carried out or when photography with a tripod is done under the above setup.

During the panning the apparatus operates to compensate for the operation of panning in the same manner as in the case of the vibration, thereby working against the panning.

During the operation with the tripod the vibration due to the hand shake is very little, while mounting of the tripod becomes a cause of image blur because of vibration from the ground, though little, and because of high-frequency impact from a quick return mirror or a shutter mechanism. These vibrations could be a cause of output of an error signal from the fluctuation detecting sensor, and actuation of the blur preventing mechanism during the operation with the tripod will sometimes cause the image blur to the contrary. If the image blur correction mechanism is also actuated under the circumstances not necessitating prevention of blur, there will arise a problem that the power is dissipated more than necessary.

In view of this aspect, for example, Japanese Patent Application Laid-Open No. 5-134283, which was filed by the present applicant, proposed a camera permitting selection of a blur prevention mode by means of switch means for selection thereof out of a normal prevention mode having an image blur correction characteristic with more emphasis on the normal prevention of hand shake, a blur prevention mode having an image blur correction characteristic with more emphasis on a panning countermeasure (a blur prevention mode for panning), and a blur prevention mode having an image blur correction characteristic with more emphasis on a tripod countermeasure (a blur prevention mode for tripod).

With the camera having the plural blur prevention modes, there would occur improper selection of a blur prevention mode selected by the operation of the camera.

For example, when during selection of the prevention mode for tripod or the prevention mode for panning the power supply of the camera was turned off once and then again on and if the camera was of a type maintaining a previous prevention mode as it was, there occurred some troubles where a beginner carried out photography in the expectation of the normal prevention mode without being aware of that fact, resulting in failure in photography because of the mischoice of the prevention mode.

On the other hand, the apparatus can also be constructed to set a non-prevention mode or the blur prevention mode having the image blur correction characteristic with more emphasis on the normal hand shake prevention on the occasion of next power-on, but, for example in the case of a man intending to continue photography with the tripod, if the prevention mode is changed as described above every off of power, the man has to change the blur prevention mode to the prevention mode for tripod every next power-on, resulting in poor operability.

SUMMARY OF THE INVENTION

One aspect of the invention is an image blur correction apparatus comprising: image blur correction means; setting means for selectively making such setting that the image blur correction means operates, at least, either in a first image blur correction characteristic or in a second image blur correction characteristic different from the first image blur correction characteristic; changeover means for performing circular changeover of an image blur correction characteristic set by the setting means, every execution of a common predetermined operation on a predetermined operation member; and reset means for forcibly setting the image blur correction means so as to operate in the first image blur correction characteristic at start of power supply to the image blur correction apparatus, irrespective of what is the latest image blur correction characteristic set according to the operation on the operation member, thus providing the apparatus with good operability.

Another aspect of the invention is an image blur correction apparatus comprising: image blur correction means; setting means for selectively setting an image blur correction mode in which a predetermined image blur correction operation is carried out and a non-image-blur correction mode in which the predetermined image blur correction operation is not carried out; setting changeover means for, in a state in which the setting means is set in the image blur correction mode, changing setting of the setting means over from the image blur correction mode to the non-image-blur correction mode in response to a predetermined operation on a predetermined operation member and for, in a state in which the setting means is set in the non-image-blur correction mode, changing setting of the setting means over from the non-image-blur correction mode to the image blur correction mode in response to the same operation as the predetermined operation on the predetermined operation member; memory means for storing a setting state of the setting means when power supply to the image blur correction apparatus is interrupted; and acting means for setting the setting means in the setting state stored in the memory means, at start of the power supply to the image blur correction apparatus, thus providing the apparatus with good operability.

Another aspect of the invention is an image blur correction apparatus comprising: image blur correction means; setting means for selectively setting an image blur correction mode in which a predetermined image blur correction operation is carried out and a non-image-blur correction mode in which the predetermined image blur correction operation is not carried out; setting changeover means for, in a state in which the setting means is set in the image blur correction mode, changing setting of the setting means over from the image blur correction mode to the non-image-blur correction mode in response to a predetermined operation on a predetermined operation member and for, in a state in which the setting means is set in the non-image-blur correction mode, changing setting of the setting means over from the non-image-blur correction mode to the image blur correction mode in response to the same operation as the predetermined operation on the predetermined operation member; and reset means for forcibly changing setting of the setting means into the non-image-blur correction mode at start of power supply to the image blur correction apparatus, irrespective of which mode is the latest mode set in response to the operation on the operation member, thus providing the apparatus with good operability.

BRIEF DESCRIPTION OF THE DRAWINGS

FIG. 2 is a diagram to show selected states of blur prevention modes by a mode selection switch of FIG. 1;

FIGS. 3A, 3B, 3C and 3D are diagrams to show display states upon selection of the respective prevention modes in an external display section of FIG. 1;

DETAILED DESCRIPTION OF THE PREFERRED EMBODIMENTS

The present invention will be described in detail, based on the embodiments illustrated.

Figure 1:
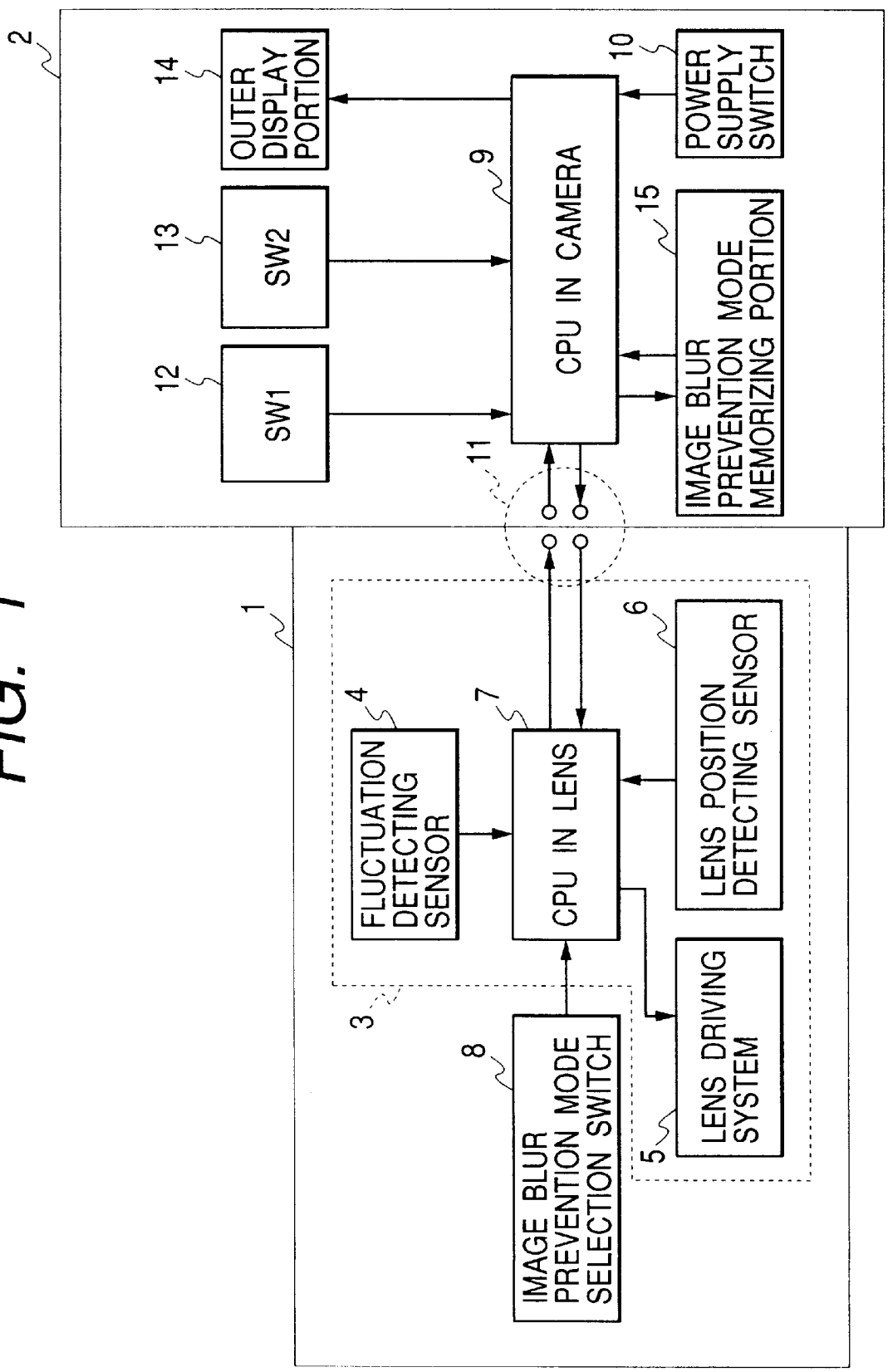
FIG. 1 is a block diagram to show the structure of a single-lens reflex camera according to the first embodiment of the present invention.

FIG. 1 is a block diagram to show the schematic structure of the single-lens reflex camera according to the first embodiment of the present invention, wherein the single-lens reflex camera is composed of an interchangeable lens 1 and a camera body 2.

The interchangeable lens 1 is provided with an image blur preventing system 3 having a fluctuation detecting sensor 4 for detecting fluctuation of the camera, a lens driving system 5 for driving a correction lens, a position detecting sensor 6 for detecting a position of the correction lens, and a CPU 7 in the lens; and a selection switch 8 for selecting an image blur prevention mode. The camera body 2 is provided with a CPU 9 in the camera, a power switch 10, a photometry switch 12 (SW1), a release switch 13 (SW2), an external display section 14 for displaying a selection status of image blur prevention mode, and a prevention mode memory 15 for storing the image blur prevention mode.

The operation of the components of FIG. 1 will be described below.

The fluctuation detecting sensor 4 detects the shake of camera and the in-lens CPU 7 performs control of driving of the lens driving system 5, based on a detection signal thereof, thus effecting image blur correction. The in-lens CPU 7 effects feedback control on the lens driving system 5, based on position signals from the lens position detecting sensor 6.

The prevention mode selecting switch 8 is a switch of a depression type, which can successively switch the image blur prevention mode→every depression in such a fashion of non-prevention mode→normal prevention mode→prevention mode for panning→prevention mode for tripod→non-prevention mode, . . . , as shown in FIG. 2. Image blur correction characteristics of the respective prevention modes that can be selected are different from each other according to their purposes. The prevention mode selection switch 8 may be a switch of any other type (for example, a touch type or the like) as to the operation type itself as long as it can successively switch setting every depression as described.

Each of the prevention modes described above will be detailed.

The normal prevention mode is a mode having an image blur correction characteristic so set as to suitably prevent the vibration caused by the hand shake of man and by the shutter and the quick return mirror of the camera, wherein the normal hand shake of man has the frequencies of about 1 to 12 Hz and the vibration of the shutter and the quick return mirror of the camera has frequencies of about 20 to 200 Hz. When this normal prevention mode is selected, photography can be conducted with less failure due to the vibration while well compensating for the hand shake of man as described above and further demonstrating the preventing effect of the high-frequency vibration of the shutter and the quick return mirror as well.

The prevention mode for panning is a mode having an image blur correction characteristic with more emphasis on prevention of vibration during the panning operation of camera (field changing operation), which is a mode for disabling a part of the image blur correction characteristic of the above normal prevention mode. The panning operation of camera normally has large fluctuation in a specific direction while having a low frequency of 1 Hz or less, and the large fluctuation occurs at almost constant speed. If the camera is set in the normal prevention mode, though the field is changed by the panning operation, this operation will be determined to be the hand shake and the camera will work so as to compensate for the shake, so that a malfunction will occur in the blur preventing mechanism, so as to result in failing to achieve an appropriate blur preventing effect. Therefore, the camera is set so that in the prevention mode for panning, determination of the panning operation is made upon detection of vibration of low frequency and large fluctuation or upon detection of large fluctuation at constant speed, based on a fluctuation signal detected by the fluctuation detecting sensor, and the part (the image blur correction characteristic in the frequency band of the panning operation) is disabled out of the image blur correction characteristic of the normal prevention mode so as not to actuate the blur preventing mechanism against the vibration and the fluctuation at constant speed.

The prevention mode for tripod is a mode having the image blur correction characteristic with emphasis on the image blur correction for preventing the image blur caused by the high-frequency impact, for example, from the quick return mirror and the shutter mechanism as described previously when the camera is used with being fixed on the tripod. This mode is also a mode for disabling a part of the image blur correction characteristic of the normal prevention mode described above. When the camera is fixed on the tripod, it is normally possible to take photographs without the hand shake, but there still remains a little vibration from the quick return mirror and the shutter mechanism of the camera. There also exists the high-frequency vibration transmitted through the tripod from the ground. Accordingly, in the prevention mode for tripod, prevention is unnecessary for the vibration of frequencies corresponding to the hand shake of man out of those in the normal prevention mode, and the camera is so set that in the prevention mode for tripod the part (the image blur correction characteristic in the frequency band of hand shake ranging 1 to 12 Hz) is disabled out of the image blur correction characteristic of the normal prevention mode so as to compensate for the vibration from the quick return mirror and the shutter mechanism of the camera and the vibration from the ground.

A selection status of prevention mode is sent through the in-lens CPU 7 to the in-camera CPU 9, and the mode selection status is displayed in real time on the external display section 14 of the camera.

FIGS. 3A to 3D are diagrams to show display examples of the prevention modes in the external display section 14 of the camera.

When the non-prevention mode is selected, "OFF" is displayed in the external display section 14 as shown in FIG. 3A; when the normal prevention mode is selected, "1" as shown in FIG. 3B; when the prevention mode for panning is selected, "2" as shown in FIG. 3C; when the prevention mode for tripod is selected, "3" as shown in FIG. 3D.

The in-lens CPU 7 changes the image blur correction characteristic, according to selection by the prevention mode selection switch 8.

When the power switch 10 is turned off in a selected state of a prevention mode, the in-camera CPU 9 records the selection status of the current prevention mode in the prevention mode memory 15. When the power of the camera is again turned on, various initializations are carried out and thereafter the information about selection of prevention mode recorded is read out. If the previous operation was ended in the non-prevention mode, the non-prevention mode is selected. If the previous mode is either one of the normal prevention mode, the prevention mode for panning, and the prevention mode for tripod, the normal prevention mode is automatically selected.

When the photometry switch SW1 becomes on thereafter, the in-camera CPU 9 checks the prevention mode selection switch 8 through the in-lens CPU 7, actuates the blur preventing function, and carries out a sequence of operations thereafter, AE (autoexposure) and AF (autofocus) operations. When the release switch SW2 becomes on, the photographing operation is carried out. Since during this photography the blur preventing function works with the image blur prevention characteristic set by the in-lens CPU 7, the photography can be done with the blur preventing effect. When the power of the camera is turned off, the in-camera CPU 9 records the selection status of the current prevention mode in the prevention mode memory 15 in the same manner as described above.

Figure 4B:
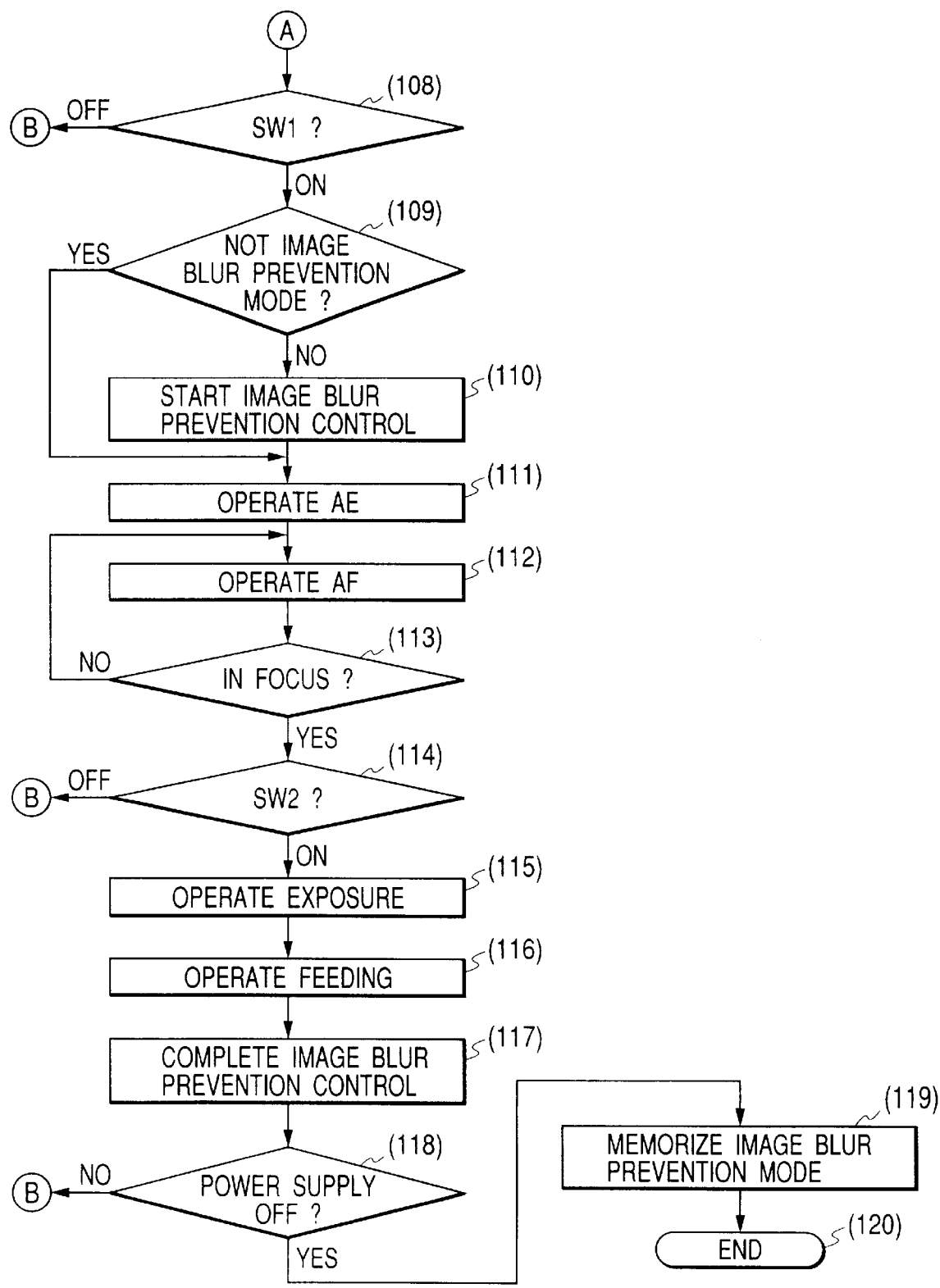
FIG. 4 is comprised of FIGS. 4A and 4B illustrating flowcharts to show the operation of the single-lens reflex camera in the first embodiment of the present invention.

The operation in the in-camera CPU 9 (and in the in-lens CPU 7) will be described below according to the flowcharts of FIGS. 4A and 4B.

When the power switch 10 of the camera becomes on, the CPU proceeds from step (100) to step (101) to initialize the inside of the camera body 1 and the inside of the interchangeable lens 2. Then the CPU goes to step (102) to read the prevention mode information selected before on of the power switch 10 out of the prevention mode memory 15. In subsequent step (103), if the previous prevention mode information read is the non-prevention mode, the CPU proceeds to step (104) to select the non-prevention mode here and display the mode selected in the external display 14, and then goes to step (106). If the previous prevention mode information read is either one of the normal prevention mode, the prevention mode for panning, and the prevention mode for tripod, the CPU proceeds to step (105) to automatically select the normal prevention mode herein and display the prevention mode selected in the external display 14, and then moves to step (106).

It is determined in step (106) whether the prevention mode selection switch 8 is depressed. When the determination is affirmative, the CPU goes to step (107) to change the prevention mode, based on the number of depressions on the prevention mode selection switch 8, and to display the prevention mode after the change in the external display 14, and then advances to step (108). When the prevention mode selection switch 8 is not manipulated, the CPU immediately proceeds to step (108) to check the status of the photometry switch SW1. If the photometry switch SW1 is off then the CPU returns to step (106); if the photometry switch SW1 is on then the CPU goes to step (109) to determine whether the non-prevention mode is selected. If the non-prevention mode is selected then the CPU immediately moves to step (111); if not, then the CPU goes to step (110) to start the blur prevention control in the selected prevention mode, and then goes to step (111).

In step (111) the AE operation is carried out; in next step (112) the AF operation is carried out; in subsequent step (113), if it is determined that focus is not achieved yet by the above AF operation, the flow returns to step (112) to carry out the AF operation again. When focus is achieved thereafter, the CPU goes from step (113) to step (114) to check the status of the release switch SW2 herein. If the switch SW2 is off then the CPU returns to step (106). If the release switch SW2 is on then the CPU moves to step (115) to perform the exposure operation. In next step (116) the feeding operation of film is carried out and in subsequent step (117) the blur prevention control is terminated.

In next step (118) it is checked whether the power switch 10 is turned off. If it is not off then the CPU returns to step (106). If off, the CPU goes to step (119) to store the prevention mode at the off of the power supply in the prevention mode memory 15. Accordingly, the prevention mode memory 15 stores the latest prevention mode that was selected by the prevention mode selection switch 8 before the off of the power supply, and this information will be read out, specifically, in aforementioned step (102) immediately after next on of power. Then the sequential operation is completed in step (120).

Since this first embodiment is arranged so that the previous prevention mode is checked in response to the power-on operation of the camera, the non-prevention mode is automatically set with absence of the prevention mode set, and the normal prevention mode is preferentially set with presence of the prevention mode set, the first embodiment permits the operator, even a beginner, to make little failure due to mischoice of the prevention mode, such as taking a photograph under setting in a special prevention mode, thus eliminating chances of such failure as photography with improper image blur correction.

(Modification)

Figure 7:
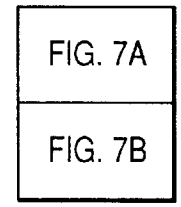
FIG. 7 is comprised of FIGS. 7A and 7B illustrating flowcharts to show the operation in a modification of the first embodiment.
Figure 7A:
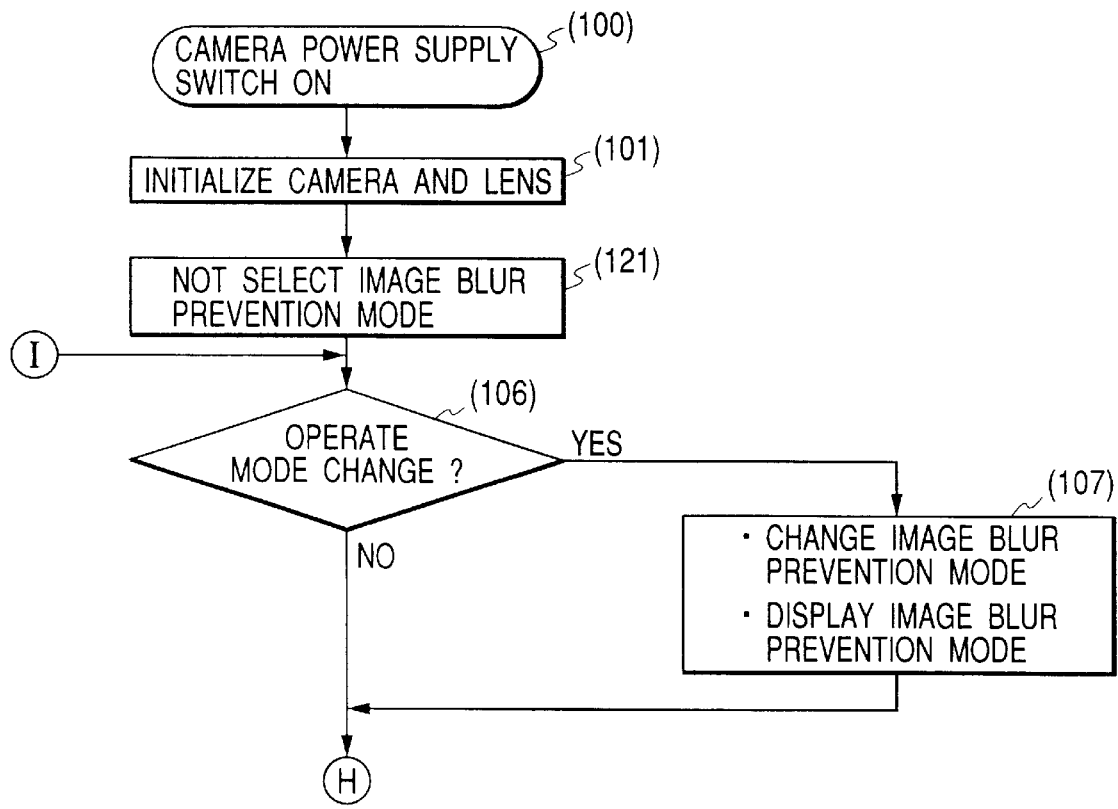
Figure 7B:
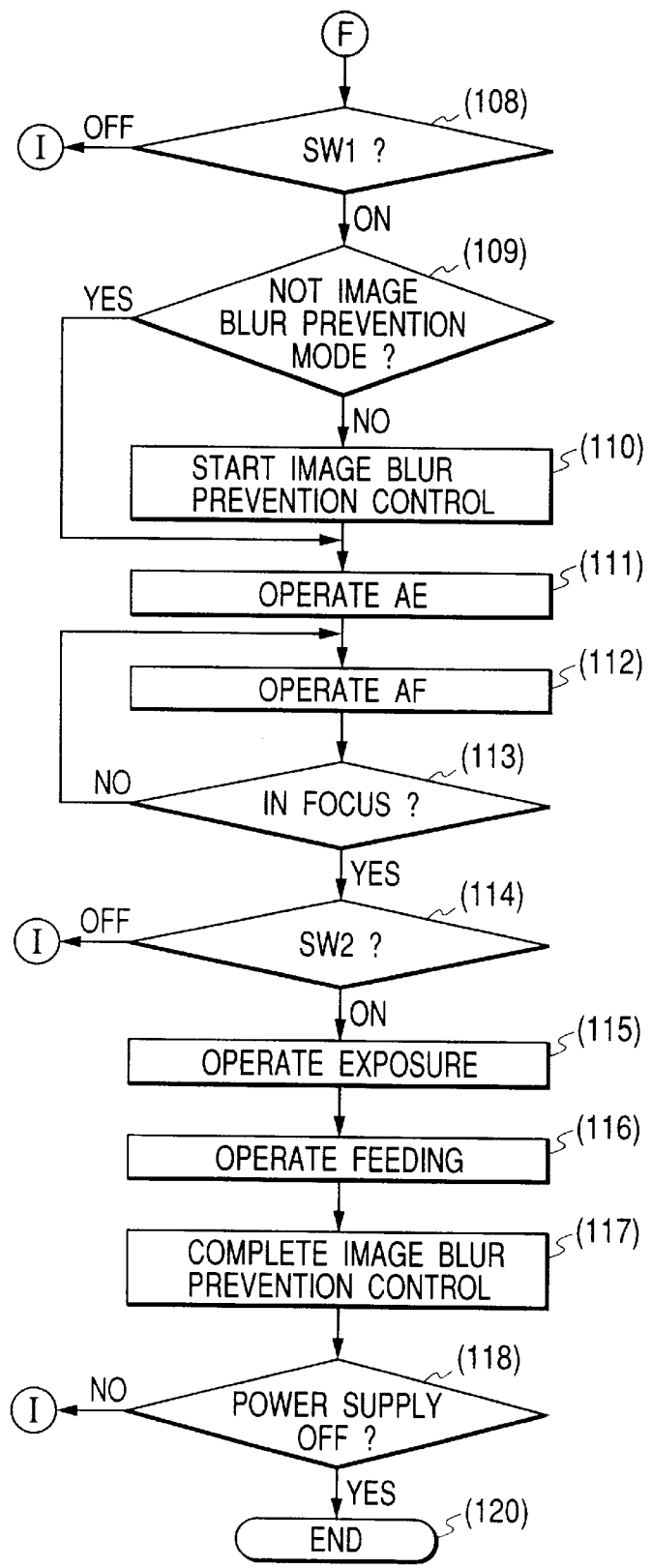

FIGS. 7A and 7B are flowcharts to show the operation in a modification of the above-stated embodiment, in which steps (100), (101), (106) to (118), and (120) are the same as in the flowcharts shown in FIGS. 4A and 4B, and thus only different steps will be described. In this example, the camera is forced to be set in the non-prevention mode at on of the power switch, irrespective of which mode was selected at the time of previous off of power. At on of power the camera is always set in the non-prevention mode in step (121) via steps (100) and (101).

(Second Embodiment)

Next described is the single-lens reflex camera of the second embodiment according to the present invention. The circuit setup of this camera is the same as in FIG. 1 and only one structural difference is that the prevention mode selection switch 8 was the switch of the depression type in the first embodiment described above, whereas it is a slide switch in this embodiment.

In this second embodiment, if a prevention mode different from the previous prevention mode is selected at on of power by the prevention mode selection switch 8 of the slide type, the prevention mode now selected is set; if the same prevention mode as the previous one is maintained to the contrary, the normal prevention mode is preferentially selected regardless of the switch.

Figure 5A:
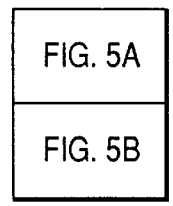
FIG. 5 is comprised of FIGS. 5A and 5B illustrating flowcharts to show the operation of a single-lens reflex camera in the second embodiment of the present invention.
Figure 5:
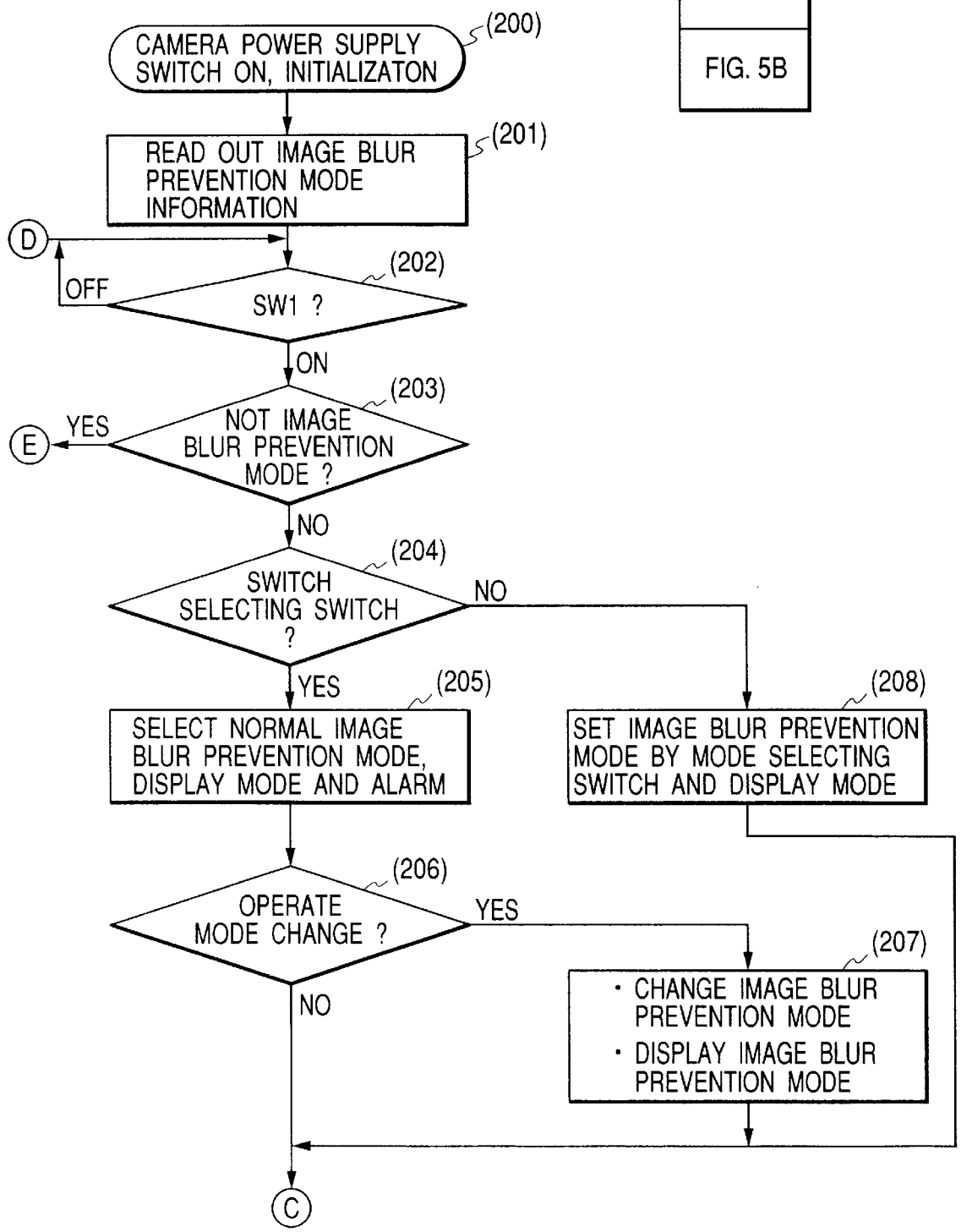

The operation will be described below according to the flowcharts of FIGS. 5A and 5B.

When the power switch of the camera is turned on in step (200), the CPU carries out various initializations and goes to step (201). In this step (201) the CPU reads information of the prevention mode that was selected before on of the power supply switch 10, out of the prevention mode memory 15. In subsequent step (202) the CPU checks the status of the photometry switch SW1; if the photometry switch SW1 is off then the CPU stays in this step before on; if the photometry switch SW1 is on then the CPU goes to step (203) to determine whether the non-prevention mode or not. If the non-prevention mode, the CPU moves to step (210).

On the other hand, if not the non-prevention mode, the CPU goes from step (203) to step (204) to check whether the prevention mode selected by the prevention mode selection switch 8 is maintained in the previous state. If the previous prevention mode is maintained as it was (or if the prevention mode selection switch 8 is at the same slide position as before), the CPU proceeds to step (205) to preferentially select the normal prevention mode herein, because whether a proper prevention mode is selected is uncertain. In addition, an alarm is given to the photographer by display and sound to indicate that the prevention mode that disagrees with the prevention mode currently selected by the prevention mode selection switch 8 is automatically selected. Then the CPU goes to step (206) to determine whether the slide switch operation of the prevention mode selection switch 8 is carried out because the photographer wants the previous mode after checking the display and alarm (in this case, the photographer needs to slide the switch once to a position of another prevention mode of no interest and thereafter slide the switch up to the position of the intended prevention mode again). If the determination is affirmative, the CPU moves to step (207) to change the prevention mode to the one selected by the prevention mode selection switch 8 and display the prevention mode after the change in the external display 14, and then goes to step (209). If the prevention mode selection switch 8 is not manipulated, then the CPU immediately goes to step (209).

If the previous prevention mode is not maintained and thus selection is changed, the CPU goes to step (208) to select the prevention mode selected by the prevention mode selection switch 8 and display it, and then goes to step (209).

In step (209) the blur prevention control is started in the selected prevention mode; in next step (210) the AE operation is carried out; in subsequent step (211) the AF operation is carried out; in step (212) it is determined whether focus is achieved by the above AF operation. If focus is not achieved then the CPU returns to step (211) to carry out the AF operation again. When focus is achieved thereafter, the CPU goes from step (212) to step (213) to check the status of the release switch SW2 herein. If the switch SW2 is off then the CPU returns to step (202). If the release switch SW2 is on then the CPU goes to step (214) to carry out the exposure operation. In next step (215) the CPU then performs the feeding operation of film and in subsequent step (216) the blur prevention control is terminated.

In next step (217) it is checked whether the power switch 10 is off. If not off the CPU returns to step (202). If off the CPU goes to step (218) to store the prevention mode at the off of power in the prevention mode memory 15. Then the CPU completes the sequential operation in step (219).

Since this second embodiment is also arranged so that when the prevention mode checked after on of power is the same as the previous prevention mode, the normal prevention mode, which is most frequently used by beginners, is automatically set, because whether a proper prevention mode is selected is not always certain, the second embodiment can decrease failure in photography due to mischoice of prevention mode, such as photography under setting in a special prevention mode, so that the blur prevention function of the camera becomes easier to use.

When the prevention mode (the normal prevention mode) different from the status of the prevention mode selection switch 8 is automatically set, the alarm is given by display and sound (or either one of them) to indicate the fact (specifically, the fact that the prevention mode selected by the prevention mode selection switch 8 is different from the prevention mode automatically set by the camera in practice). Therefore, in the case where photographs are continuously taken by use of the tripod, the blur prevention effect suitable for the photography with the tripod can be achieved by returning the switch to the previous prevention mode for tripod.

(Third Embodiment)

Next described is the single-lens reflex camera of the third embodiment according to the present invention. The circuit setup of this camera is the same as in FIG. 1, and thus the details thereof are omitted herein.

The third embodiment is arranged in view of the following point. People who have some experience in use of camera will make relatively less setting error of prevention mode and feel troublesome when the same prevention mode as before is set but is always changed to the normal prevention mode as in the first embodiment (i.e., when the previous prevention mode is desired to be used continuously).

Figures 6, 6A, 6B:
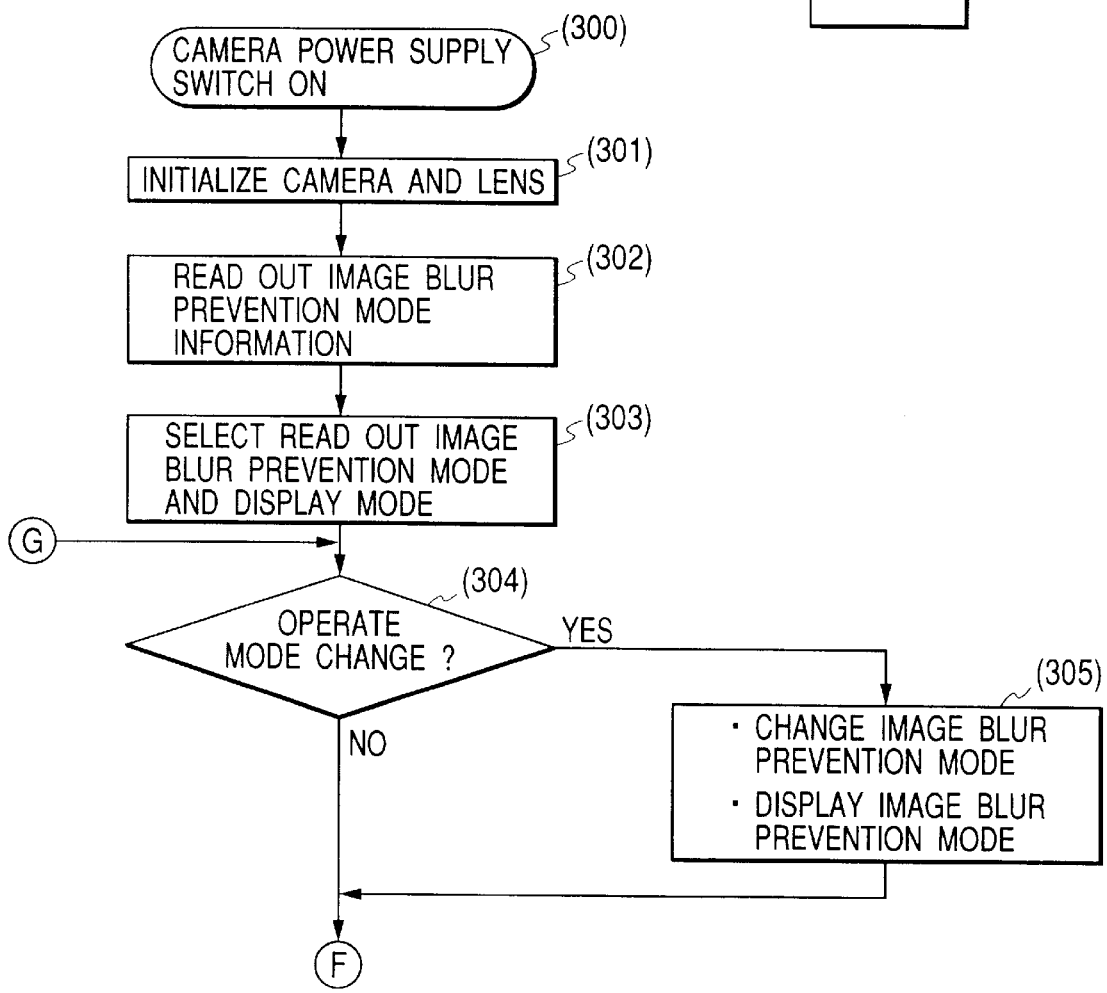
FIG. 6 is comprised of FIGS. 6A and 6B illustrating flowcharts to show the operation of a single-lens reflex camera in the third embodiment of the present invention.
Figure 6B:
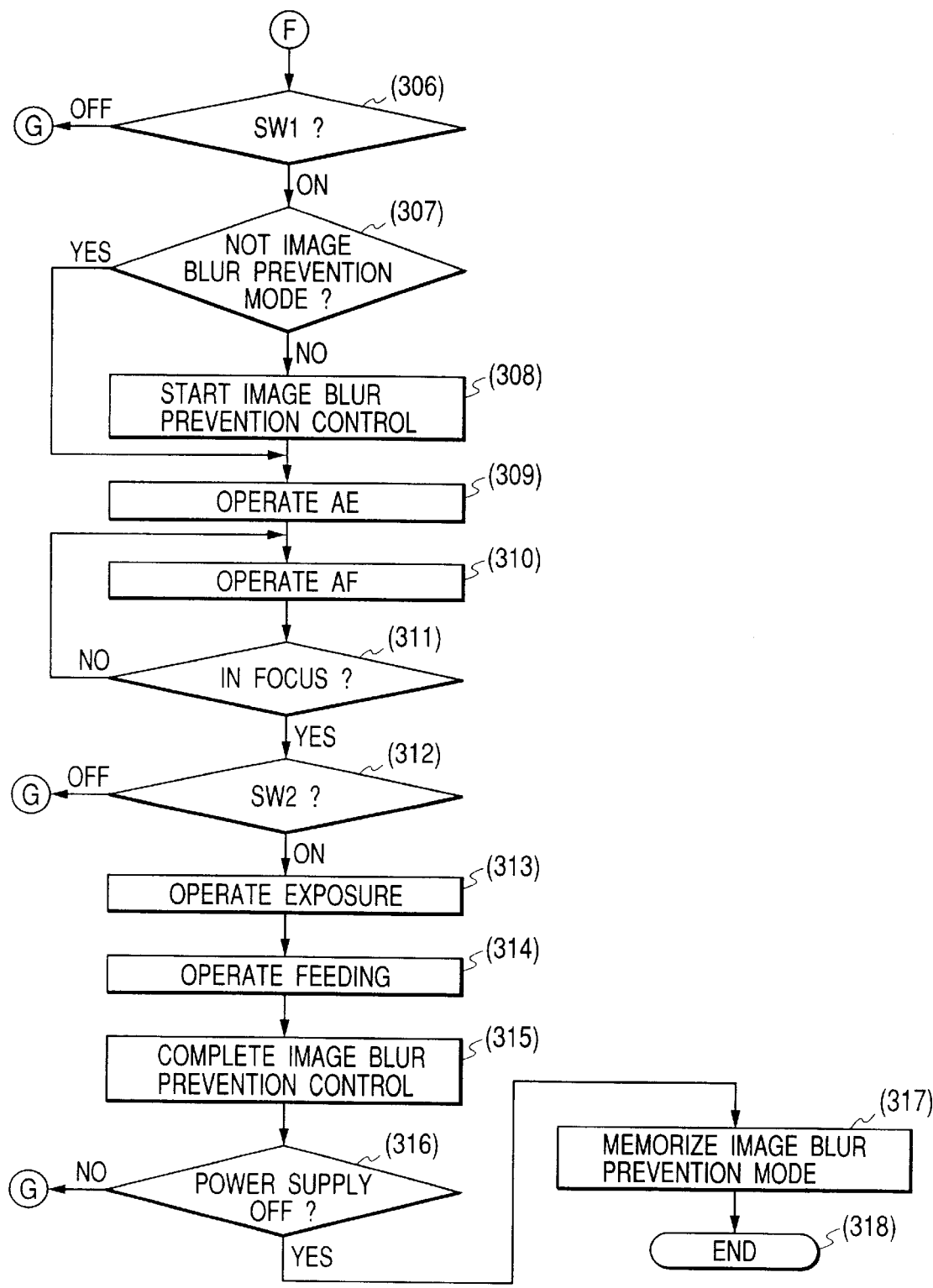

The operation in the in-camera CPU 9 (and in the in-lens CPU 7) will be described according to the flowcharts of FIGS. 6A and 6B.

When the power switch 10 of the camera is turned on, the CPU goes from step (300) to step (301) to initialize the inside of the camera body 1 and the inside of the interchangeable lens 2. Then the CPU goes to step (302) to read the information of the prevention mode that was selected before the on of the power switch 10, out of the prevention mode memory 15. In subsequent step (303) the CPU sets the previous prevention mode thus read and displays the prevention mode selected, in the external display section 14, and the CPU then goes to step (304).

In step (304) it is determined whether the photographer depressed the prevention mode selection switch 8 with checking the display of the above prevention mode and desiring to select a different mode from the previous prevention mode. If depressed then the CPU goes to step (305) to change the prevention mode, based on the number of depressions on the prevention mode selection switch 8, and display the prevention mode after the change in the external display 14, and then goes to step (306). When the prevention mode selection switch 8 is not manipulated, the CPU immediately goes to step (306) to check the status of the photometry switch SW1. If the photometry switch SW1 is off then the CPU returns to step (304).

If the photometry switch SW1 is on, the CPU proceeds to step (307) to determine whether the non-prevention mode is selected. If the non-prevention mode is selected, then the CPU immediately proceeds to step (309); if otherwise the CPU goes to step (308) to start the blur prevention control in the selected prevention mode, and then goes to step (309).

In step (309) the AE operation is carried out; in next step (310) the AF operation is carried out; in subsequent step (311), if it is determined that focus is not achieved by the above AF operation, the CPU returns to step (310) to carry out the AF operation again. When focus is achieved thereafter, the CPU goes from step (311) to step (312) to check the status of the release switch SW2. If the switch SW2 is off then the CPU returns to step (304). If the release switch SW2 is on then the CPU moves to step (313) to carry out the exposure operation. In next step (314) the CPU carries out the feeding operation of film and in subsequent step (315) the CPU terminates the blur prevention control.

In next step (316) it is checked whether the power switch 10 is off. When not off, the CPU returns to step (304). If off, the CPU goes to step (317) to store the prevention mode at the off of power in the prevention mode memory 15. In step (318) the sequential operation is completed.

This third embodiment is arranged so that in response to the power-on operation of the camera the previous prevention mode is checked and set assuming that the read prevention mode is also used this time. This can eliminate the troublesome operation, for example, in the case where the photographer desires to continuously use the same prevention mode for tripod as before, but the mode is changed to the normal prevention mode every off of power and thus the photographer must perform the operation for returning the prevention mode to the previous prevention mode for tripod.

In the case where failure in photography would occur unless a prevention mode different from the previous prevention mode is set, at the same time as setting of the previous prevention mode, the prevention mode thus set is also displayed to allow the photographer to confirm it, so that photography can also be performed without failure in this case.

(Correspondence between the invention and the embodiments)

In each of the embodiments described above, the prevention mode selection switch 8 corresponds to selecting means of the prevent invention, the CPUs 7, 9 to image blur correction characteristic setting means of the present invention, the external display section 14 to display means of the present invention, and the prevention mode memory 15 to memory means of the present invention.

The above is the correspondence relation between the components of the embodiments and the components of the present invention, but it should be noted that the present invention is not limited to these components of the embodiments and may involve any components that can achieve the functions as set forth in the appended claims, or the functions that the embodiments have.

(Modifications)

The present invention was described with the examples applied to the single-lens reflex cameras, but the present invention can also be applied to such cameras as video cameras or electronic still cameras. Further, the present invention can also be applied to the image blur correction apparatus used in optical instruments such as binoculars.

As detailed above, the above-stated embodiments of the present invention provide the image blur correction apparatus that can perform the proper image blur correction operation without mischoice of prevention mode.

The present invention can also provide the cameras that can prevent the failure in photography due to improper image blur correction while preventing mischoice of prevention mode.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image blur correction apparatus comprising:
   image blur correction means;
   setting means for selectively setting a mode of operation of said image blur correction means such that said image blur correction means operates, at least, either with a first image blur correction characteristic or a second image blur correction characteristic different from said first image blur correction characteristic;
   changeover means for performing circular changeover of an image blur correction characteristic set by said setting means, every execution of a common predetermined operation of a predetermined control member; and
   reset means for re-setting the mode of operation of said image blur correction means so as to operate in the first image blur correction characteristic at start of power supply to the image blur correction apparatus, irrespective of a latest image blur correction characteristic set according to operation of the predetermined control member.

2. The apparatus according to claim 1, wherein said changeover means comprises means for performing circular changeover of the image blur correction characteristic every depression of a predetermined depression type.

3. The apparatus according to claim 1, wherein said image blur correction means comprises means for operating in a first frequency characteristic in the first image blur correction characteristic and for operating in a second frequency characteristic, different from the first frequency characteristic, in the second image blur correction characteristic.

4. The apparatus according to claim 3, wherein said image blur correction means comprises means for performing an image blur correction operation for correcting fluctuations in a predetermined frequency band in the first image blur correction characteristic and, in the second image blur correction characteristics, for disabling an image blur correction operation for correcting fluctuations in a partial frequency band out of the predetermined frequency band.

5. The apparatus according to claim 3, wherein said image blur correction means comprises means for performing an image blur correction operation for correcting fluctuations in a predetermined frequency band having a low frequency limit in said first image blur correction characteristic and, in the second image blur correcting characteristic, for setting the low frequency limit for the image blur correction operation higher than in the first image blur correction characteristic.

6. The apparatus according to claim 1, wherein said setting means comprises means for selectively operating said image blur correction means in the first and second image blur correction characteristics and further in a third image blur correction characteristic different from the first and second image blur correction characteristics, and said changeover means comprises means for effecting circular changeover among the first, second, and third image blur correction characteristics, in response to successive operations of the predetermined control member.

7. The apparatus according to claim 1, wherein said image blur correction means comprises correction optical means.

8. The apparatus according to claim 1, wherein said image blur correction apparatus is adapted to a camera, and said image blur correction means comprises means for starting an image blur correction operation in an image blur correction characteristic set by said setting means, in response to a predetermined operation of a release control member of said camera.

9. The apparatus according to claim 1, wherein said setting means comprises means for making predetermined display means display which image blur correction characteristic is set.

10. An image blur correction apparatus comprising:

image blur correction means;

setting means for selectively setting said image blur correction means in one of an image blur correction mode in which a predetermined image blur correction operation is carried out and a non-image-blur correction mode in which said predetermined image blur correction operation is not carried out;

setting changeover means for, in a state in which said setting means is set in the image blur correction mode, changing over the setting of said setting means the from image blur correction mode to the non-image-blur correction mode in response to a predetermined operation of a predetermined control member and for, in a state in which said setting means is set in the non-image-blur correction mode, changing over the setting of said setting means from the non-image-blur correction mode to the image blur correction mode in response to a same predetermined operation of the predetermined control member;

memory means for storing the setting state of said setting means when power supply to said image blur correction apparatus is interrupted; and initialization means for setting said setting means in the setting state stored in said memory means, at start of power supply to the image blur correction apparatus.

11. The apparatus according to claim 10, wherein said changeover means comprises means for changing over the setting state of said setting means in response to depression of a switch of a predetermined depression type.

12. The apparatus according to claim 10, wherein said image blur correction means comprises correction optical means.

13. The apparatus according to claim 10, wherein said image blur correction apparatus is adapted to a camera and said image blur correction apparatus comprises means for, in the state in which said setting means is set in the image blur correction mode, starting an image blur correction operation in response to a predetermined operation of a release control member of said camera.

14. The apparatus according to claim 10, wherein said setting means comprises means for making predetermined display means display an indicate a setting state.

15. An image blur correction apparatus comprising:

image blur correction means;

setting means for selectively setting said image blur correction means in one of an image blur correction mode in which a predetermined image blur correction operation is carried out and a non-image-blur correction mode in which the predetermined image blur correction operation is not carried out;

setting changeover means for, in a state in which said setting means is set in the image blur correction mode, changing over the setting of said setting means from the image blur correction mode to the non-image-blur correction mode in response to a predetermined operation of a predetermined control member and for, in a state in which said setting means is set in the non-image-blur correction mode, changing over the setting of said setting means from the non-image-blur correction mode to the image blur correction mode in response to a same predetermined operation of the predetermined control member; and reset means for resetting the setting of said setting means to the non-image-blur correction mode at start of power supply to the image blur correction apparatus, irrespective of a latest mode set in response to operation of the predetermined control member.

16. The apparatus according to claim 15, wherein said changeover means comprises means for changing over the setting state of said setting means in response to depression of a switch of a predetermined depression type.

17. The apparatus according to claim 15, wherein said image blur correction means comprises correction optical means.

18. The apparatus according to claim 15, wherein said image blur correction apparatus is adapted to a camera and said image blur correction apparatus comprises means for, in the state in which said setting means is set in the image blur correction mode, starting an image blur correction operation in response to a predetermined operation of a release control member of said camera.

19. The apparatus according to claim 15, wherein said setting means comprises means for making predetermined display means display an indication to indicate a setting state.

* * * * *

UNITED STATES PATENT AND TRADEMARK OFFICE
CERTIFICATE OF CORRECTION

PATENT NO. : 6,097,895
DATED : August 1, 2000
INVENTOR(S) : KIYOMITSU FURUYAMA

It is certified that error appears in the above-identified patent and that said Letters Patent is hereby corrected as shown below:

Column 1

Line 28, "camera," should read --a camera,--.

Column 3

Line 62, "camera" should read --a camera--.

Column 4

Line 3, "mode → every" should read --mode every--.

Column 6

Line 40, "at the off" should read --upon the turning off--.
    Line 44, "the off" should read --the turning off--.

UNITED STATES PATENT AND TRADEMARK OFFICE
CERTIFICATE OF CORRECTION

PATENT NO. : 6,097,895

DATED : August 1, 2000

INVENTOR(S) : KIYOMITSU FURUYAMA

It is certified that error appears in the above-identified patent and that said Letters Patent is hereby corrected as shown below:

Column 7

Line 1, "off of power. At on of power" should read --turning off of power. At power "ON",--.
    Line 13, "on" should read --turning on--.
    Line 24, "on" should read --turning on--.
    Line 28, "on;" should read --it is on;--.
    Line 31, "If" should read --If in--.
    Line 32, "if not" should read --if not in--.

Column 8

Line 12, "If not" should read --If it is not--, and "If" should read --If it is--.
    Line 14, "off" should read --turning off--.
    Line 17, "on of power" should read --power "on"--.
    Line 45, "less setting error" should read --fewer setting errors--.
    Line 59, "on" should read --turning on--.

Column 9

Line 2, "depressed" should read --depressed,--.
    Line 30, "not" should read --it is not-, and "off," should read --it is off,--.

UNITED STATES PATENT AND TRADEMARK OFFICE
CERTIFICATE OF CORRECTION

PATENT NO. : 6,097,895

DATED : August 1, 2000

INVENTOR(S) : KIYOMITSU FURUYAMA

It is certified that error appears in the above-identified patent and that said Letters Patent is hereby corrected as shown below:

Column 9

Line 32, "off" should read --turning off--.
    Line 42, "off" should read --turning off--.
    Line 56, "9" should read --9 correspond--.
    Line 58, "14" should read --14 corresponds--.
    Line 60, "15" should read --15 corresponds--.

Column 10

Line 16, "Drawings" should read --drawings--.

Column 11

Line 45, "the from" should read --from the--.
    Line 59, "initialization" should be deleted.
    Line 60, "start" should read --a start--.

UNITED STATES PATENT AND TRADEMARK OFFICE
CERTIFICATE OF CORRECTION

PATENT NO. : 6,097,895
DATED : August 1, 2000
INVENTOR(S) : KIYOMITSU FURUYAMA

It is certified that error appears in the above-identified patent and that said Letters Patent is hereby corrected as shown below:

Column 12

Line 15, "indicate" should read --indication to indicate--.
Line 39, "start" should read --a start--.

Signed and Sealed this

Seventeenth Day of April, 2001

Attest:

NICHOLAS P. GODICI

Attesting Officer

Acting Director of the United States Patent and Trademark Office